(12) United States Patent
Cai

(10) Patent No.: US 12,393,554 B2
(45) Date of Patent: Aug. 19, 2025

(54) METHOD, APPARATUS, DEVICE AND MEDIUM FOR PROCESSING DISTRIBUTED FILE

(71) Applicant: Beijing Volcano Engine Technology Co., Ltd., Beijing (CN)

(72) Inventor: Jun Cai, Beijing (CN)

(73) Assignee: BEIJING VOLCANO ENGINE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/736,430

(22) Filed: Jun. 6, 2024

(65) Prior Publication Data
US 2024/0411729 A1     Dec. 12, 2024

(30) Foreign Application Priority Data

Jun. 7, 2023   (CN) .......................... 202310671910.1

(51) Int. Cl.
G06F 16/00      (2019.01)
G06F 16/14      (2019.01)
G06F 16/182     (2019.01)

(52) U.S. Cl.
CPC .......... *G06F 16/182* (2019.01); *G06F 16/148* (2019.01)

(58) Field of Classification Search
None
See application file for complete search history.

(56) References Cited

U.S. PATENT DOCUMENTS

| | | | |
|---|---|---|---|
| 10,037,369 B1 * | 7/2018 | Bono | G06F 16/1727 |
| 10,346,360 B1 | 7/2019 | Basov | |
| 2022/0236904 A1 * | 7/2022 | Miller | G06F 3/0673 |

FOREIGN PATENT DOCUMENTS

| | | | | |
|---|---|---|---|---|
| CN | 102754069 A | * | 10/2012 | ........... G06F 9/3004 |
| CN | 103250141 A | * | 8/2013 | ......... G06F 12/0802 |

OTHER PUBLICATIONS

Extended European Search Report for European Patent Application No. 24180503.5, mailed Oct. 29, 2024, 12 pages.
Hartman J.H., "The Zebra Striped Network File System," PHD Thesis, University of California at Berkeley, Retrieved from the Internet URL: http://www.cl.cam.ac.uk/research/srg/netos/plana/dump/zebra.pdf, Jan. 1, 1994, 148 pages.
Nagle D., et al., "The Panasas ActiveScale Storage Cluster—Delivering Scalable High Bandwidth Storage," Supercomputing, Proceedings of the ACM/IEEE SC 2004 Conference Pittsburgh, Nov. 6-12, 2004, 10 pages.

* cited by examiner

*Primary Examiner* — Tuankhanh D Phan
(74) *Attorney, Agent, or Firm* — Astute IP Law Group

(57) ABSTRACT

Embodiments of the present disclosure provide a method, apparatus, device and medium for processing a distributed file. The method comprises: receiving a read request sent by a user, wherein a file is distributedly written into a magnetic disk array in a sliced data form; querying a pre-read chain list in a memory according to the read request, wherein each file node in the pre-read chain list comprises at least one chain of ordered data blocks; in a case that a pre-read condition is satisfied, reading sliced data from the magnetic disk array according to a pre-read policy and the read request to generate ordered pre-read data, to store the pre-read data into a file node of the pre-read chain list in an ordered manner in the data block form, and to send a read response containing the target data to the user.

20 Claims, 7 Drawing Sheets

Receive a read request sent by a user, wherein the read request comprises an identifier of a file to which target data to be read belongs, and an identifier of a position of the target data in the file, and wherein the file is distributedly written into a magnetic disk array in a sliced data form ⟶ 201

Query a pre-read chain list in a memory according to the read request, wherein the pre-read chain list comprises at least one file node, each file node comprises at least one chain of ordered data blocks, and each data block stores pre-read data corresponding to the file node ⟶ 202

In a case that a file node matching the identifier of the file is not found in the pre-read chain list in the querying, determine whether the read request satisfies a sequential read behavior according to the identifier of the position, and whether a currently-recorded number of times of the sequential read behavior satisfies a sequential read threshold ⟶ 203

In a case that the sequential read behavior and the sequential read threshold are satisfied, read sliced data from the magnetic disk array according to a pre-read policy and the read request to generate ordered pre-read data comprising the target data, to store the pre-read data into a file node of the pre-read chain list in an ordered manner and in a data block form, and to send a read response containing the target data to the user ⟶ 204

FIG.2

METHOD, APPARATUS, DEVICE AND MEDIUM FOR PROCESSING DISTRIBUTED FILE

CROSS-REFERENCE TO RELATED APPLICATION(S)

This application claims priority to Chinese Application No. 202310671910.1 filed in Jun. 7, 2023, the disclosures of which are incorporated herein by reference in their entities.

FIELD

The present disclosure relates to a technical field of data processing, and particularly to a method, apparatus, device and medium for processing a distributed file.

BACKGROUND

Where a magnetic disk serves as a part for data persistence for an electronic device, a read speed of the magnetic disk is often a painful point of delay. The read speed of the magnetic disk is limited by the Input/Output Per Second (IOPS) (or the number of reads/writes) of the magnetic disk.

In the related art, a related file is stored in the magnetic disk with a file granularity to improve the read speed of the file, a data end position of the currently-read data is determined. Before the next data reading request is obtained, the data end position of the currently-read data is taken as a starting position of the data that might need to be read next time. The related file is read in advance in the magnetic disk to obtain the data that might need to be read next time, and the read data is stored in a cache. For example, referring to FIG. 1, the current file A contains 2048K data, and the file A with 2048K data is entirely stored in the magnetic disk. In a case that the data end position of the current read data is 0-128K of the file A, 128K-256K of data is read in advance in the magnetic disk and stored in the memory, so as to directly read 128K-256K of data of file A in the memory, thereby improving data reading efficiency.

However, in the above data pre-reading manner, an applicable scenario is a scenario in which data storage is performed with a file granularity. However, with the popularity of the storage mode of a distributed system, the same file may be split into multiple sliced data for storage. Therefore, the above pre-reading manner is no longer applicable, and there is an urgent need for a method for pre-reading a file from a magnetic disk array into a memory so as to enable a user to subsequently directly read the data of the file from the memory.

SUMMARY

In order to solve the above technical problems or at least partially solve the above technical problems, the present disclosure provides a method, apparatus, device and medium for processing a distributed file. In the present technical solution, based on the determination of the number of times of sequential read behavior, the data to be read next time is accurately predicted and pre-read, which improves the hit rate of the pre-read data; furthermore, the data pre-reading is performed based on the storage characteristics of the distributed system, which realizes the pre-reading of the file under the distributed system and improves the throughput rate of the pre-reading the data.

Embodiments of the present disclosure provide a method for processing a distributed file, including: receiving a read request sent by a user, wherein the read request includes an identifier of a file to which target data to be read belongs, and an identifier of a position of the target data in the file, and wherein the file is distributedly written into a magnetic disk array in the sliced data form; querying a pre-read chain list in a memory according to the read request, wherein the pre-read chain list includes at least one file node, each file node includes at least one chain of ordered data blocks, and each data block stores pre-read data corresponding to the file node; in a case that a file node matching the identifier of the file is not found in the pre-read chain list in the querying, determining whether the read request satisfies a sequential read behavior according to the identifier of the position, and whether a currently-recorded number of times of the sequential read behavior satisfies a sequential read threshold; and in a case that the sequential read behavior and the sequential read threshold are satisfied, reading sliced data from the magnetic disk array according to a pre-read policy and the read request to generate ordered pre-read data including the target data, to store the pre-read data into a file node of the pre-read chain list in an ordered manner in a data block form, and to send a read response containing the target data to the user.

Embodiments of the present disclosure provide an apparatus for processing a distributed file, including: a receiving module configured to receive a read request sent by a user, wherein the read request includes an identifier of a file to which target data to be read belongs, and an identifier of a position of the target data in the file, and wherein the file is distributedly written into a magnetic disk array in the sliced data form; a querying module configured to query a pre-read chain list in a memory according to the read request, wherein the pre-read chain list includes at least one file node, each file node includes at least one chain of ordered data blocks, and each data block stores pre-read data corresponding to the file node; a determining module configured to, in a case that a file node matching the identifier of the file is not found in the pre-read chain list in the querying, determine whether the read request satisfies a sequential read behavior according to the identifier of the position, and whether a currently-recorded number of times of the sequential read behavior satisfies a sequential read threshold; a reading module configured to, in a case that the sequential read threshold is satisfied, read sliced data from the magnetic disk array according to a pre-read policy and the read request to generate ordered pre-read data including the target data, to store the pre-read data into a file node of the pre-read chain list in an ordered manner in a data block form, and to send a read response containing the target data to the user.

Embodiments of the present disclosure further provide an electronic device, including: a processor; a memory configured to store an instruction executable by the processor; wherein the processor is configured to read the executable instructions from the memory and execute the instruction to implement the method for processing the distributed file according to embodiments of the present disclosure.

Embodiments of the present disclosure further provide a computer-readable storage medium stored with a computer program for executing the method for processing the distributed file according to embodiments of the present disclosure.

The technical solutions according to the embodiments of the present disclosure have the following advantages compared with the prior art:

The distributed file pre-reading solution according to the embodiments of the present disclosure includes: receiving a read request sent by a user, wherein the read request includes an identifier of the file to which target data to be read belongs, and an identifier of the position of the target data in the file, and wherein the file is distributedly written into a magnetic disk array in the sliced data form; querying a pre-read chain list in a memory according to the read request, wherein the pre-read chain list includes at least one file node, each file node includes at least one chain of ordered data blocks, and each data block stores pre-read data corresponding to the file node; in a case that a file node matching the identifier of the file is not found by querying the pre-read chain list, determining whether the read request satisfies a sequential read behavior according to the identifier of the position, and whether the currently-recorded number of times of the sequential read behavior satisfies a sequential read threshold; in a case that the sequential read behavior and the sequential read threshold are satisfied, reading sliced data from the magnetic disk array according to a pre-read policy and the read request to generate ordered pre-read data, including the target data, to store the pre-read data into a file node of the pre-read chain list in an ordered manner in a data block form, and to send a read response containing the target data to the user. In the present technical solution, based on the determination of the number of times of the sequential read behaviors, the data to be read next time is accurately predicted and pre-read, which improves the hit rate of the pre-read data; furthermore, the pre-read data is maintained in the pre-read chain list in the data block form for the distributed file, and the data pre-reading is performed based on the storage characteristics of the distributed system, which realizes the pre-reading of the file under the distributed system and improves the throughput rate of the pre-reading the data.

BRIEF DESCRIPTION OF THE DRAWINGS

The above and other features, advantages, and aspects of embodiments of the present disclosure will become more apparent with reference to the following detailed description when taken in conjunction with the accompanying drawings. Throughout the drawings, the same or similar reference numerals indicate the same or similar elements. It should be understood that the drawings are diagrammatic and that elements are not necessarily drawn to scale.

FIG. 2 is a schematic flow chart of a method for processing a distributed file according to an embodiment of the present disclosure;

DETAILED DESCRIPTION

Figure 1:
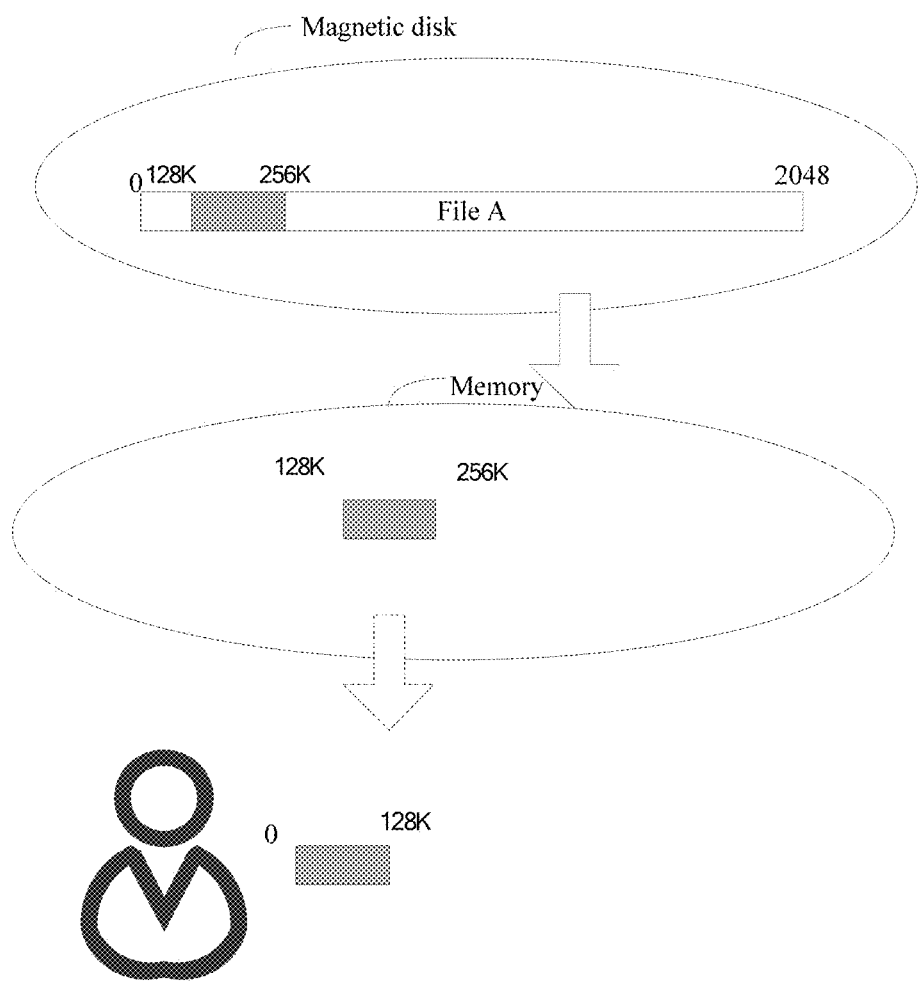
FIG. 1 is a schematic diagram of a file-pre-reading scenario according to the prior art.

Hereinafter, embodiments of the present disclosure will be described in more detail with reference to the accompanying drawings. While certain embodiments of the present disclosure have been illustrated in the accompanying drawings, it is to be understood that the present disclosure may be embodied in various forms and should not be construed as being limited to the embodiments set forth herein. Rather, these embodiments are provided to help understand the present disclosure more thoroughly and completely. It should be understood that the drawings and embodiments of the present disclosure are for illustrative purposes only and are not intended to limit the scope of the present disclosure.

It should be understood that the various steps recited in method embodiments of the present disclosure may be performed in a different order and/or in parallel. Moreover, the method embodiments may include additional steps and/or omit performing the steps shown. The scope of the present disclosure is not limited in this respect.

As used herein, the terms "include", and variations thereof are open-ended terms, i.e., "include, but not limited to". The term "based on" is "based, at least in part, on". The term "one embodiment" means "at least one embodiment". The term "another embodiment" means "at least one further embodiment". The term "some embodiments" means "at least some embodiments". Relevant definitions of other terms will be given in the following description.

It should be noted that concepts such as "first" and "second" mentioned in the present disclosure are only intended to distinguish between different devices, modules, or units and are not intended to limit the order or interdependence of the functions performed by the devices, modules, or units.

It needs to be appreciated that the modifiers "one" and "more" in the present disclosure are intended to be illustrative and not restrictive, and those skilled in the art should understand that the modifiers should be understood as "one or more" unless the context clearly indicates otherwise.

The names of messages or information interacted between devices in embodiments of the present disclosure are for illustrative purposes only and are not intended to limit the scope of such messages or information.

As mentioned above in the Background, with the popularity of the storage mode of a distributed system, a file is distributedly stored on a multi-magnetic disk array in the slices form. However, the current pre-reading manner is directed to a scenario of storage in a single magnetic disk with a file granularity, and is not applicable for a scenario of distributed storage of the file. Therefore, in order to solve the above problem, embodiments of the present disclosure provide a method for processing a distributed file. In this method, in a case that there is a sequential read behavior on the distributed file, a direct read of relevant file data from a memory can also be achieved, thereby greatly improving a throughput rate of the pre-reading.

The method will now be described with reference to specific embodiments.

FIG. 2 is a schematic flow chart of a method for processing a distributed file according to an embodiment of the present disclosure. The method may be performed by an apparatus for processing the distributed file, wherein the apparatus may be implemented by a software and/or a hardware, and may generally be integrated in an electronic device. As shown in FIG. 2, the method includes the following steps.

Step 201: a read request sent by a user is received, wherein the read request includes an identifier of a file to which target data to be read belongs, and an identifier of a position of the target data in the file, and wherein the file is distributedly written into a magnetic disk array in the sliced data form.

Figure 3:
FIG. 3 is a schematic diagram of a scenario for distributed storage of a file according to an embodiment of the present disclosure.

In one embodiment of the present disclosure, the file is stored in a distributed storage manner. In the present embodiment, the file is divided into a plurality of sliced data in advance, and the plurality of sliced data are stored and written into a magnetic disk array, wherein the magnetic disk array may include a plurality of object-based storage devices. For example, as shown in FIG. 3, the magnetic disk array includes four object-based storage devices OSD1, OSD2, OSD3 and OSD4, wherein the file is divided into a plurality of data blocks (block-set1 and block-set2 in the figure). Each data block is divided into a plurality of sliced data, for example, block-set1 includes 16 sliced data, namely, strips 1 through 16, and block-set2 contains 16 sliced data, namely, strips 17 through 32, wherein at least one sliced data is stored in each object-based storage device in the magnetic disk array, and the sliced data stored in each object-based storage device have a sequential relationship therebetween, but the sequence may be continuous or discontinuous. For example, further referring to FIG. 3, the sliced data stored in OSD1 may be strip 1, strip 4, strip 8 and strip 12 etc. which are discontinuous. Because of this complex file storage form with the sliced data as the granularity in the distributed storage system, in embodiments of the present disclosure, the data pre-reading can no longer be performed in the pre-reading manner in the file storage form with the file as the granularity as stated in the Background.

In the embodiments of the present disclosure, after the file is stored in the above-mentioned distributed storage manner, the read request sent by a user is received. The read request includes the identifier of the file to which target data to be read belongs, and the identifier of the file may be any identifier information for uniquely locating the file, such as a file code. In addition, the read request further includes the identifier of the position of the target data in the file, so as to position the read data corresponding to the read request based on the identifier of the position. The identifier of the position includes, but is not limited to, a byte range of the target data in the corresponding file (for example, the identifier of the position may be a 128K to 256K position of the corresponding file), a corresponding specific data block identifier, a corresponding specific switching data identifier, etc.

Step 202: a pre-read chain list in a memory is queried according to the read request, wherein the pre-read chain list includes at least one file node, each file node includes at least one chain of ordered data blocks, and each data block stores pre-read data corresponding to the file node.

It should be appreciated that the memory may be a cache space, and the relevant pre-read data may be cached in the memory, so that the reading of the relevant data may be performed in the memory, and the direct reading of the relevant data in the magnetic disk may be avoided, and the throughput rate of data reading may be greatly improved. In an embodiment of the present disclosure, the management of the pre-read data is performed in the pre-read chain list form in the memory, wherein the pre-read chain list includes at least one file node, each file node includes at least one chain ordered data blocks, each data block in the chain of data blocks stores the pre-read data corresponding to the file node, and each data block is composed of the above-mentioned plurality of sliced data, wherein each file node includes at least one segment node, and each segment node corresponds to one chain of ordered data blocks, and each chain of data blocks includes at least one sequentially connected data block. Even if the sliced data corresponding to each data block is stored in a distributed manner, forming a corresponding chain of data blocks by using data blocks as constituent units may also ensure the complete acquisition of the corresponding data. That is to say, the data blocks included in each chain of data blocks have a sequential relationship, the data blocks included in the chains of data blocks corresponding to different segment nodes may not be continuous, and the segment node is used for indicating the position of pre-read data stored in the data block in the file by a serial number of a chain of data blocks.

Figure 4:
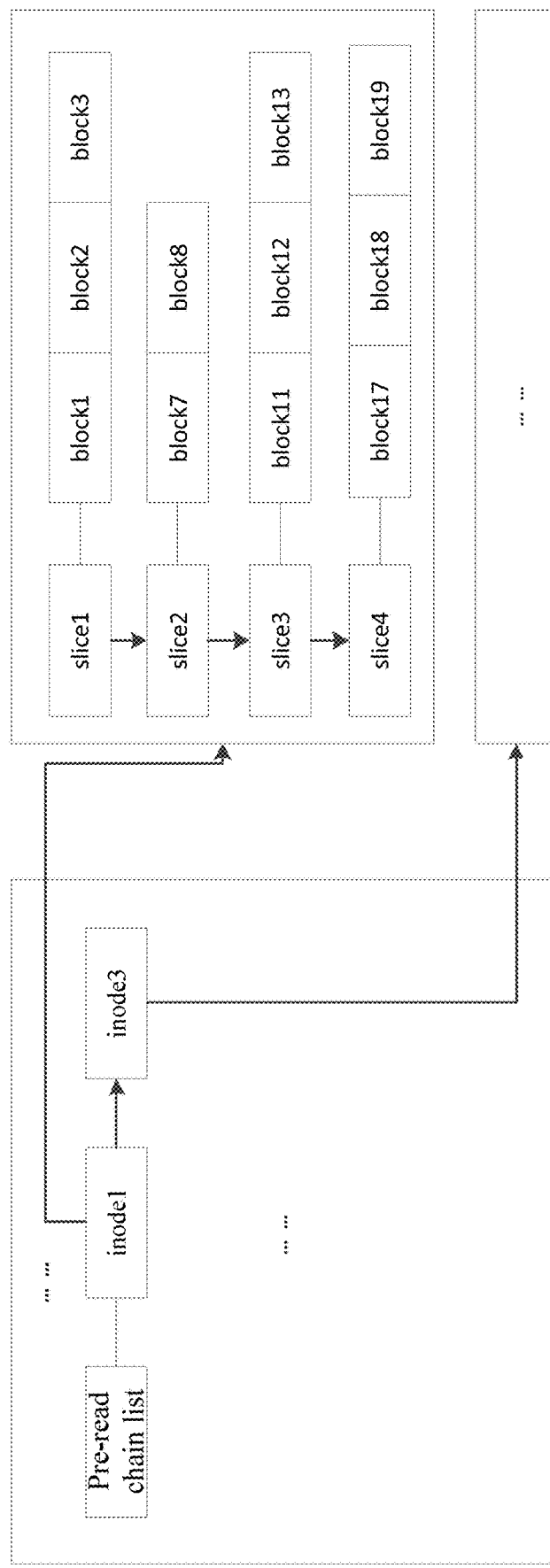
FIG. 4 is a schematic diagram of compositions of a pre-read chain list according to an embodiment of the present disclosure.

In order to more clearly describe the composition structure of the above-mentioned pre-read chain list, an illustration is presented below with reference to a possible structure of the pre-read chain list. As shown in FIG. 4, the pre-read chain list includes file nodes inode1 and inode3, wherein the file node inode1 includes four chains of ordered data blocks slice1, slice2, slice3 and slice4. The slice1, slice2, slice3 and slice4 may be considered as four segment nodes, wherein each segment node includes at least one data block. The sequential arrangement among the data blocks constitutes a corresponding chain of data blocks, wherein each data block may include at least one sliced data. That is to say, referring to the above FIG. 3, stripe 1 through strip 16 constitute a data block. The segment node indicates the position of the pre-read data stored in the data block in the file by the serial number of the chain of data blocks, for example, regarding the segment node slice1, a plurality of data blocks block1, block2 and block3 in the chain of data blocks are contained therein, and the pre-read data stored in the slice1 is located at the first data block, the second data block and the third data block of the corresponding file. Regarding the segment node slice2, a plurality of data blocks block 7 and block8 in the chain of data blocks are contained therein, and the pre-read data stored in the slice 2 is located at the 7th data block and the 8th data block of the corresponding file. Regarding the segment node slice 3, a plurality of data blocks block11, block12 and block13 in the chain of data blocks are contained therein, and the pre-read data stored in the slice 3 is located at the 11th data block, the 12th data block and the 13th data block of the corresponding file. Regarding the segment node slice 4, a plurality of data blocks block 17, block 18 and block 19 in the chain of data blocks are contained therein, and the pre-read data stored in slice4 is located at the 17th data block, 18th data block and 19th data block of the corresponding file. That is to say, the segment nodes slice1-slice4 all indicate the order of the pre-read data stored in the data blocks in the file by the serial numbers of the chains of data blocks corresponding thereto.

Step 203: in a case that a file node matching the identifier of the file is not found in the pre-read chain list in the querying, determining whether the read request satisfies a sequential read behavior according to the identifier of the position, and whether a currently-recorded number of times of sequential read behavior satisfies a sequential read threshold.

In an embodiment of the present disclosure, in order to further improve data reading efficiency, firstly, the target data corresponding to the read request is queried in the pre-read chain list according to the identifier of the file. In a case that a file node matching the identifier of the file is not found in the pre-read chain list, obviously the target data does not exist in the current pre-read chain list; therefore, secondly, a determination is made according to the identifier of the position as to whether the read request satisfies the sequential read behavior. The so-called sequential read behavior means that the target data corresponding to a data request is continuous with and can be connected with historical data corresponding to a previous data request, which is of a predictable reference significance for predicting the data to be read by the user next time.

In addition, in one embodiment of the present disclosure, after the read request satisfies the sequential read behavior, in order to improve the hit rate of pre-read data and avoid the effect of accidental sequential read, a determination is further made as to whether the currently-recorded number of times of the sequential read satisfies a sequential read threshold. Here, the sequential read threshold may be defined according to needs of scenarios.

Certainly, in a case that the target file node matching the identifier of the file is found in the querying, in the pre-read chain list, but a segment node matching the identifier of the position is not found, the determination is still made as to whether the read request satisfies the sequential read behavior according to the identifier of the position, and whether the currently-recorded number of times of the sequential read behavior satisfies the sequential read threshold.

In some possible embodiments, a starting position for reading the file is determined according to the identifier of the file and the identifier of the position, a previous ending position pre-recorded in pre-read mode is obtained, and whether the read request is the sequential read behavior is determined according to the starting position and the previous ending position.

For example, in a case that the previous ending position pre-recorded in the pre-read mode is last_pos and the starting position for reading the file is offset, and in a case that the offset and the last_pos can be connected together, it is determined that the read request is the sequential read behavior. Herein, in one embodiment of the present disclosure, after the reading of the target data is completed, a data length of the target data may also be obtained, and the last_pos may be updated according to the starting position for reading the file and the data length.

In addition, considering that in actual implementation, if only a continuous sequential read behavior is considered to be a valid sequential read behavior, a mis-determination is probably caused. Therefore, in order to ensure the accurate determination of the sequential read behavior, in one embodiment of the present disclosure, in a case that the read request is determined to be a non-sequential behavior, and after a failed read response is sent to the user so as to instruct to directly read the target data from the magnetic disk array by the user, the number of times of the non-sequential read behavior may be increased by one to determine whether the current number of times of the non-sequential read reaches a preset random read threshold. In a case that it is determined that the number of times of the non-sequential read reaches the random read threshold, it is determined that a switching condition of the pre-read mode is satisfied, and relevant parameters recorded in the pre-read mode are set to be zero, for example, the number of times of sequential read behavior recorded in the pre-read mode is zero-cleared. In a case that it is determined that the current number of times of the non-continuous read does not reach the random read threshold, it is determined that the switching condition of the pre-read mode is not satisfied, and the number of times of the sequential read behavior recorded in the pre-read mode is not zero-cleared, so as to continue to accumulate the number of times of the sequential read behavior in the case of obtaining the sequential read behaviors once, thereby avoiding the influence of accidental random read.

In one embodiment of the present disclosure, in a case that the sequential read threshold is not satisfied, a failed read response is sent to the user to instruct to read the target data directly from the magnetic disk array by the user.

Step 204: in a case that the sequential read behavior and the sequential read threshold are satisfied, the sliced data is read from the magnetic disk array according to a pre-read policy and the read request to generate ordered pre-read data including the target data, and the pre-read data is stored into a file node of the pre-read chain list in an ordered manner in a data block form, and a read response containing the target data is sent to the user.

It should be appreciated that in the embodiments of the present disclosure, each time a sequential read behavior is obtained, the number of times of the sequential read behavior is increased by one. In a case that the current number of times of sequential read behavior satisfies the sequential read threshold, i.e., is greater than or equal to the sequential read threshold, it is believed that the sequence requested by the user next time is very probably to correspond to continuous data following the target data. Therefore, in order to improve the data-reading throughput rate, the sliced data is read from the magnetic disk array according to the pre-read policy and the read request to generate ordered pre-read data, namely, in addition to the target data, the data following the target data is also pre-read so as to improve the efficiency of reading the data.

It may also be appreciated that the pre-read data includes the target data and continuous data following the target data. In the embodiment of the present disclosure, the pre-read data is stored into the file node of the pre-read chain list in an ordered manner in the data block form, to facilitate subsequent direct read of relevant data from the memory. In one embodiment of the present disclosure, in a case that the pre-read data is obtained, a read response to the target data is sent to the user so as to improve the interactive experience, for example, a prompt message that the target data is being read may be sent to the user.

It should be noted that in different application scenarios, the manners of reading sliced data from the magnetic disk array according to the pre-read policy and the read request to generate ordered pre-read data are different, and examples are given as follows.

In some possible implementations, a preset first data block pre-read mapping relationship may be queried to obtain a number of first pre-read data blocks corresponding to the number of times of the sequential read behavior, namely, a pre-read mapping relationship between the number of times of the sequential read behavior and the first data blocks is stored in advance in the first data block pre-read mapping relationship, and the first data block pre-read mapping relationship is queried to determine the number of the first pre-read data blocks.

Furthermore, a file is stored in a distributed manner with the sliced data as the granularity. Therefore, in the present implementation mode, a sliced data starting position on the magnetic disk array, the number of first pre-read data blocks and a preset data block size are determined according to the identifier of the file and the identifier of the position, and corresponding sliced data is read from the sliced data starting position of the magnetic disk array to generate ordered pre-read data. For example, a specific data starting position of a corresponding file at a corresponding position is read according to the identifier of the file and the identifier of the position, the sliced data starting position corresponding to the specific data starting position is determined, a total number of the read sliced data is determined according to the number of the first pre-read data blocks and the preset data block size, and sliced data corresponding to the total number of sliced data is read from the sliced data starting position of the magnetic disk array to generate ordered pre-read data.

As mentioned in the above-mentioned embodiments, the pre-read chain list is stored in the memory, and relevant pre-read data is also stored in the memory. Therefore, in a case that the target data is not in the existing data in the pre-read chain list in the memory, the target data might also be in the pre-read data which is being pre-read and corresponds to the pre-read chain list. Therefore, in one embodiment of the present disclosure, a pre-read flag in the pre-read chain list is queried before determining whether the read request satisfies the sequential read behavior according to the identifier of the position and whether the currently-recorded number of times of the sequential read behavior satisfies the sequential read threshold, wherein the pre-read flag is used for indicating whether the memory is reading the pre-read data from the magnetic disk array; a determination is made as to whether the memory is currently pre-reading data from the magnetic disk array according to the pre-read flag; in a case that it is determined by the querying that the pre-read flag indicates that the memory is currently pre-reading, a determination is made as to whether the data information currently pre-read contains the target data; and in a case that it is determined that the data information currently pre-read contains the target data, a completion of the pre-reading is waited and a read response containing the target data is sent to the user, thereby avoiding reading the target data from the magnetic disk.

Certainly, in a case that it is determined that the currently pre-read data information does not contain the target data, a determination is made as to whether the read request satisfies the sequential read behavior according to the position identification is performed, and whether the currently-recorded number of times of the sequential read behavior satisfies the sequential read threshold. Furthermore, the obtaining of the target data is performed depending on whether or not the sequential read threshold is satisfied, and reference may be made to the above embodiments for the specific manner of obtaining the target data. The specific manner will not be described in detail any more herein.

In one word, the embodiments of the present disclosure provide a method for processing a distributed file, including: receiving a read request sent by a user, wherein the read request includes an identifier of the file to which target data to be read belongs, and an identifier of the position of the target data in the file, and wherein the file is distributedly written into a magnetic disk array in the sliced data form; querying a pre-read chain list in a memory according to the read request, wherein the pre-read chain list includes at least one file node, each file node includes at least one chain of ordered data blocks, and each data block stores pre-read data corresponding to the file node; in a case that a file node matching the identifier of the file is not found in the pre-read chain list in the querying, determining whether the read request satisfies a sequential read behavior according to the identifier of the position, and whether the currently-recorded number of times of the sequential read behavior satisfies a sequential read threshold; in a case that the sequential read behavior and the sequential read threshold are satisfied, reading sliced data from the magnetic disk array according to a pre-read policy and the read request to generate ordered pre-read data including the target data, to store the pre-read data into a file node of the pre-read chain list in an ordered manner in a data block form, and to send a read response containing the target data to the user. In the present technical solution, based on the determination of the number of times of sequential read behaviors, the data to be read next time is accurately predicted and pre-read, which improves the hit rate of the pre-read data; furthermore, the pre-read data is maintained in the pre-read chain list in the data block form for the distributed file, and the data pre-reading is performed based on the storage characteristics of the distributed system, which realizes the pre-reading of the file under the distributed system and improves the throughput rate of the pre-reading the data.

How to obtain the target data after the target file node matching the identifier of the file is queried the pre-read chain list is described below with reference to specific embodiments.

Figure 5:
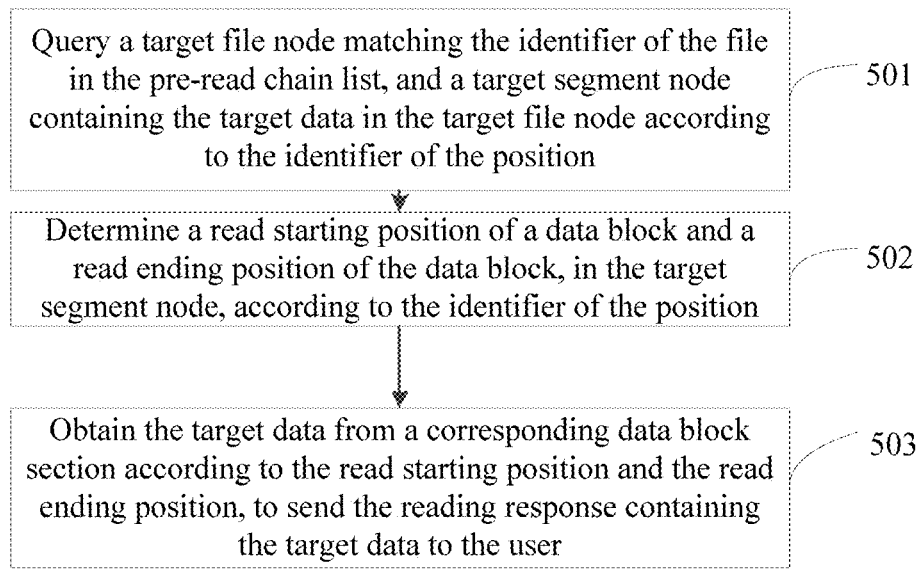
FIG. 5 is a schematic flow chart of another method for processing a distributed file according to an embodiment of the present disclosure.

In one embodiment of the present disclosure, after querying the pre-read chain list in the memory according to the read request, as shown in FIG. 5 the method further includes the following steps.

Step 501: a target file node matching the identifier of the file is queried in the pre-read chain list, and a target segment node containing the target data is queried under the target file node.

In one embodiment of the present disclosure, after the target file node matching the identifier of the file is found is queried in the pre-read chain list, the target segment node containing the target data is further queried under the target file node according to the identifier of the position, to facilitate determining whether the target data is contained in the current pre-read chain list.

Step 502: a read starting position of a data block and a read ending position of the data block in the target segment node are determined according to the identifier of the position.

In an embodiment of the present disclosure, after it is determined that there is a target segment node containing the target data in the current pre-read chain list, the read starting position of the data block and the read ending position of the data block in the target segment node are determined according to the identifier of the position, in order to obtain the target data. That is to say, in the present embodiment, the identifier of the position obviously contains a starting position identifier and an ending position identifier, etc. of the target data in the corresponding file. Accordingly, since the file is split into corresponding data blocks, the read starting positions of corresponding data blocks and the read ending positions of the corresponding data blocks may be determined according to the starting position identifier and the ending position identifier.

Step 503: the target data is obtained from a corresponding data block section according to the read starting position and the read ending position, and the reading response containing the target data is sent to the user.

In one embodiment of the present disclosure, the target data is obtained from a corresponding data block section according to the read starting position and the read ending position, and a reading response containing the target data is sent to the user, thereby achieving reading the target data in the memory without obtaining the target data by reading the magnetic disk, and substantially improving the reading efficiency of the target data.

In addition, since in the actual implementation process, a written data block might be changed, for example, the user modifies or deletes the written data block of the file. In a case that the written data block changes, obviously the relevant data block previously stored in the memory becomes invalid data. Therefore, in order to ensure the validity of the relevant target data stored in the memory, the data validity management is performed on the data block based on a version number. Whenever the data block changes, the version number of the data block is updated. Thus, in one embodiment of the present disclosure, querying is performed as to whether a pre-marked current version number corresponding to the data block section is valid, namely, querying is performed as to whether the current version number is the newest version number of the corresponding data block. In a case that it is determined from the querying that the current version number is valid, the target data is obtained from the corresponding data block section according to the read starting position and the read ending position; otherwise, in order to ensure the validity of the obtained the target data, in a case that it is determined from the querying that the current version number is invalid, a failed read response is sent to the user so as to instruct to directly read the target data from the magnetic disk array by the user.

Figure 6:
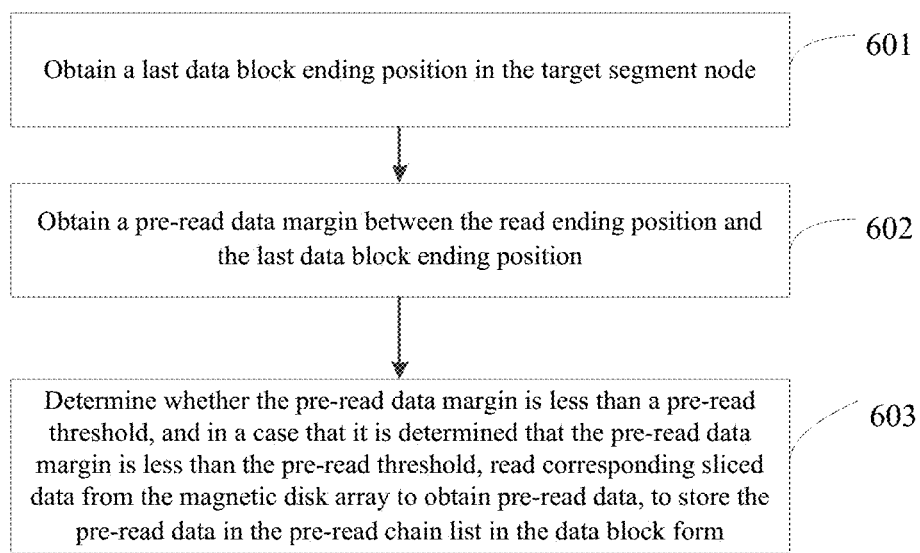
FIG. 6 is a schematic flow chart of another method for processing a distributed file according to an embodiment of the present disclosure.

It is easy to understand that all the data pre-reading mentioned in the above-mentioned embodiments are pre-reading relevant data following the target data in a case that the target data is obtained according to the read request from the magnetic disk in a case that the target data cannot be obtained from the memory in the pre-read mode, which may also be referred to as synchronous reading. In order to further improve the throughput rate of reading the data, asynchronous reading may further be performed on the data. That is to say, even if the target data can be obtained from the memory, and the target data does not need to be read from the magnetic disk, the pre-reading of relevant data following the target data may be performed. That is, in one embodiment of the present disclosure, as shown in FIG. 6, the method includes the following steps.

Step 601: a last data block ending position in the target segment node is obtained.

The ending position of the last data block in the target segment node is a corresponding data block ending position of the corresponding target data, in the chain of data blocks where the target segment node lies.

For example, in a case that the chain of data block is slice 1, and the data block ending position of the target data at slice 1 is the last sliced data of block 1, the data block ending position is the ending position of block 1.

Step 602: a pre-read data margin between the read ending position and the last data block ending position is obtained.

Step 603: determining whether the pre-read data margin is less than a pre-read threshold, and in a case that it is determined that the pre-read data margin is less than the pre-read threshold, the corresponding sliced data is read from the magnetic disk array to obtain pre-read data, and the pre-read data is stored in the pre-read chain list in the data block form.

In an embodiment of the present disclosure, the obtaining the pre-read data margin between the read ending position and the last data block ending position is a determining of how much data to be read subsequently is left in the data block chain list corresponding to the target data, and the data margin may be used as a criterion for determining whether corresponding data can be obtained in the corresponding data block chain list in a case that the sequential reading is performed next time. In a case that it is determined that the pre-read data margin is less than the preset pre-read threshold, corresponding sliced data is read from the magnetic disk array at this time to obtain the pre-read data, and the pre-read data is stored in the pre-read chain list in the data block form, namely, the following data is read into the pre-read chain list in advance.

In some possible embodiments, a second data block pre-read mapping relationship may be preset, wherein the second data block pre-read mapping relationship includes a correspondence relationship between the pre-read data margin and a number of pre-readable second pre-read data blocks. Generally, the larger the pre-read data margin is, the smaller the number of corresponding second pre-read data blocks is. In this embodiment, the preset second data block pre-read mapping relationship is queried to obtain the number of the second pre-read data blocks corresponding to the pre-read data margin, and then, corresponding sliced data is read from the magnetic disk array according to the last data block ending position, the number of the second pre-read data blocks and a preset data block size, to obtain ordered pre-read data. For example, the number of sliced data to be read is determined according to the last data block ending position, the number of the second pre-read data blocks and the preset data block size, and the corresponding sliced data is read as pre-read data starting from the sliced data corresponding to the last data block ending position according to the number of sliced data to be read.

As known from the above depictions, there may be more and more pre-read data in the memory, and the space of the memory is limited, and therefore, it is also very important to release the space in the memory in time. The storage form in the memory is a data block chain form. The cache space of the memory is released based on the data block chain to realize the refined management of the cache space of the memory. In one embodiment of the present disclosure, after it is detected that the target data block in the target segment node is read, and in consideration of a data reading scenario that the data blocks are usually read from front to back, therefore, the data before the target data block might not be read any more. In the present embodiment, a detection is made as to whether there are other data blocks previous to the target data block. In a case that there are other data blocks, a part of the data blocks previous to the target data block are deleted according to a preset interval number, wherein the preset interval number may be set according to the needs of scenarios. In a case that the preset interval number is not 1, some data blocks relatively close to the target data block may be reserved, to ensure that other users may read the corresponding data blocks. For example, in a case that the preset number of intervals is 2, all the other data blocks which are previous to the target data block and spaced apart from the target data by two or more intervals from the target data block are deleted so as to realize the timely release of the cache space of the memory.

In an embodiment of the present disclosure, it is also possible to query a latest read request time recorded in each file node in the pre-read chain list according to a preset period, and detect whether a time difference between the latest read request time and a current time is greater than a preset time threshold, to delete, from the pre-read chain list, the file node with the time difference greater than the time threshold, to delete all the data blocks corresponding to the file nodes which have not been read for a long time, so as to ensure the timely release of the cache space of the memory.

In order to make the implementation process of the method for processing the distributed file of the embodiments of the present disclosure more apparent to those skilled in the art, illustration will be presented below in conjunction with specific application scenarios.

Figure 7:
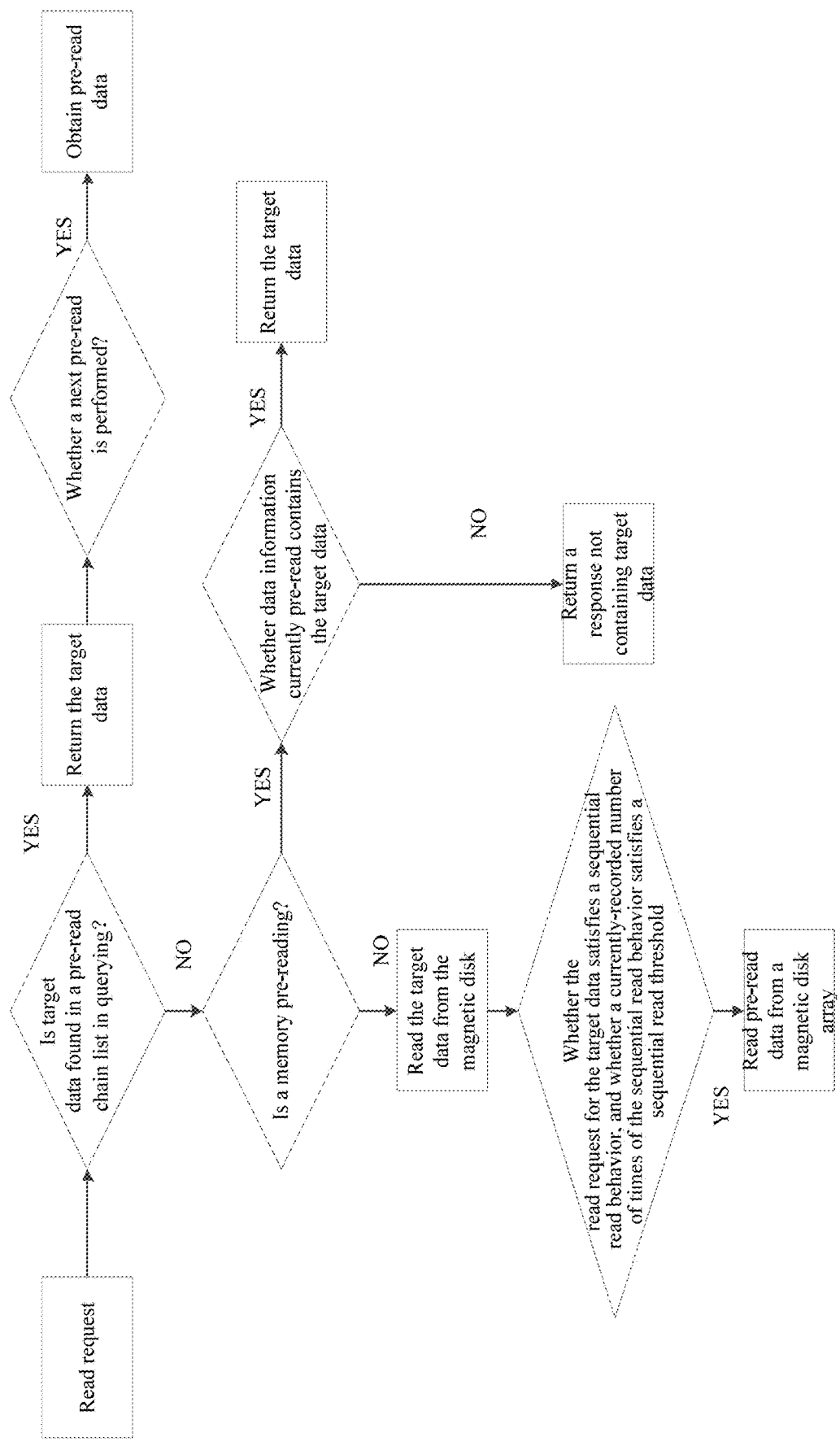
FIG. 7 is a schematic flow chart of another method for processing a distributed file according to an embodiment of the present disclosure.

In the present embodiment, referring to FIG. 7, after the file is divided and distributedly written into the magnetic disk array in the sliced data form, the read request sent by the user is received; the pre-read chain list in the memory is queried according to the read request; in a case that a file node matching the identifier of the file is queried in the pre-read chain list, and a segment node matching the identifier of the position of the read request is queried in the file node, the target data is read in the file node, and a determination is made as to whether data needs to be read in advance in the current memory. For example, the pre-read data margin between the read ending position and the last data block ending position is obtained, and determination is made as to whether the pre-read data margin is less than the preset pre-read threshold; in a case that it is determined that the pre-read data margin is less than the pre-read threshold, corresponding sliced data is read from the magnetic disk array to obtain the pre-read data, and the pre-read data is stored in the pre-read chain list in the data block form.

In a case that the file node matching the identifier of the file is queried in the pre-read chain list, a determination will be made as to whether the data information being pre-read in the memory contains the target data. In a case of YES, a read response containing the target data is sent to the user. In a case that the file node matching the identifier of the file is not found in the pre-read chain list in the querying, or in a case that the data information being pre-read does not contain the target data, the target data is read in the magnetic disk, and a determination is made as to whether the current target data read request satisfies a sequential read behavior, and as to whether the currently-recorded number of times of the sequential read behavior satisfies a sequential read threshold. In a case that the sequential read threshold is satisfied, the sliced data is read from the magnetic disk array according to the pre-read policy and the read request to generate ordered pre-read data.

In one word, according to the method for processing the distributed file of the embodiment of the present disclosure, in a case that target data is queried in the pre-read chain list, the target data may be directly read in the pre-read chain list without reading the corresponding target data from the magnetic disk, thereby further improving the reading efficiency of the target data.

To implement the above embodiments, the present disclosure further proposes an apparatus for processing a distributed file.

Figure 8:
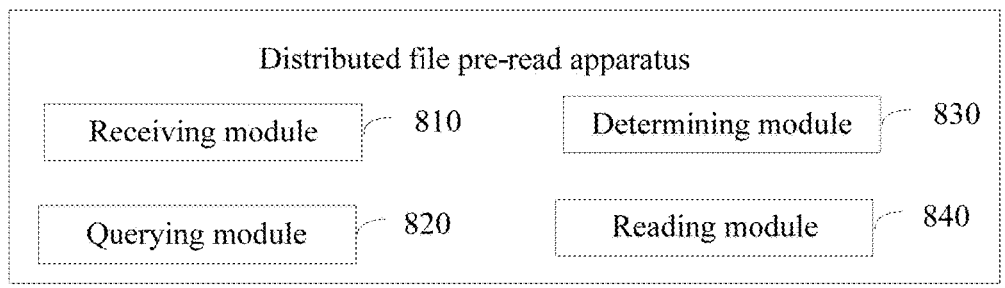
FIG. 8 is a block diagram of an apparatus for processing the distributed file according to an embodiment of the present disclosure.

FIG. 8 is a block diagram of an apparatus for processing a distributed file according to an embodiment of the present disclosure. The apparatus may be implemented in software and/or hardware, and may be generally integrated in an electronic device to pre-read the distributed file. As shown in FIG. 8, the apparatus includes: a receiving module 810, a querying module 820, a determining module 830 and a reading module 840.

The receiving module 810 is configured to receive a read request sent by a user, wherein the read request includes an identifier of the file to which target data to be read belongs, and an identifier of a position of the target data in the file, and wherein the file is distributedly written into a magnetic disk array in the sliced data form.

The querying module 820 is configured to query a pre-read chain list in a memory according to the read request, wherein the pre-read chain list includes at least one file node, each file node includes at least one chain of ordered data blocks, and each data block stores pre-read data corresponding to the file node.

The determining module 830 is configured to, in a case that a file node matching the identifier of the file is not found in the pre-read chain list in the querying, determine whether the read request satisfies a sequential read behavior according to the identifier of the position, and whether a currently-recorded number of times of the sequential read behavior satisfies a sequential read threshold.

The reading module 804 is configured to, in a case that the sequential read threshold is satisfied, read sliced data from the magnetic disk array according to a pre-read policy and the read request to generate ordered pre-read data including the target data, to store the pre-read data into a file node of the pre-read chain list in an ordered manner in the data block form, and to send a read response containing the target data to the user.

The apparatus for processing the distributed file according to the embodiment of the present disclosure may execute the method for processing the distributed file according to any embodiment of the present disclosure, and has corresponding functional modules for executing the method and advantageous effects, which will not be described in detail herein.

To implement the embodiments described above, the present disclosure further provides a computer program product including a computer program/instruction which when executed by a processor implement the method for processing the distributed file in the embodiments described above.

Figure 9:
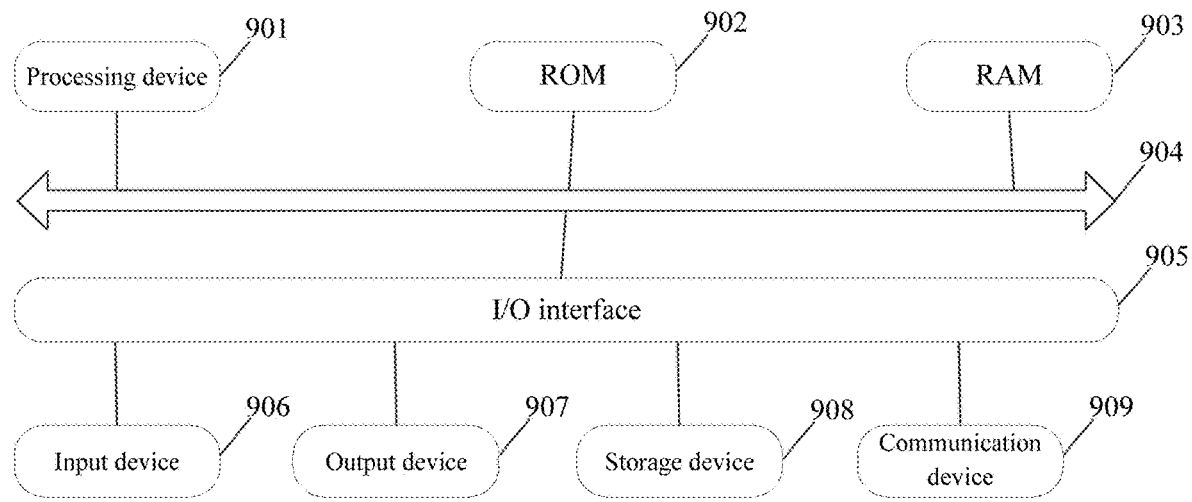
FIG. 9 is a block diagram of an electronic device according to an embodiment of the present disclosure.

FIG. 9 is a block diagram of an electronic device according to an embodiment of the present disclosure.

Specific reference is made below to FIG. 9 which illustrates a block diagram of an electronic device 900 suitable for implementing embodiments of the present disclosure. The electronic device 900 in the embodiments of the present disclosure may include, but not limited to, a mobile terminal such as a mobile phone, a notebook computer, a digital broadcast receiver, a PDA (Personal Digital Assistant), a PADs (Tablet Computer), a PMP (Portable Multimedia Player), an in-vehicle terminal (e.g., an in-vehicle navigation terminal), etc. and a fixed terminal such as a digital TV, a desktop computer, etc. The electronic device shown in FIG. 9 is merely an example and should not impose any limitations on the functionality and scope of use of embodiments of the present disclosure.

As shown in FIG. 9, the electronic device 900 may include a processing device (e.g., a central processing unit, a graph processor, etc.) 901 that may perform various suitable behaviors and processes in accordance with a program stored in a Read Only Memory (ROM) 902 or a program loaded from a storage device 908 into a Random Access Memory (RAM) 903. In the RAM 903, various programs and data needed by the operation of the electronic device 900 are also stored. The processing device 901, the ROM 902, and the RAM 903 are connected to one another via a bus 904. An input/output (I/O) interface 905 is also coupled to the bus 904.

In general, the following devices may be connected to the I/O interface 905: an input device 906 including, for example, a touch screen, a touch pad, a keyboard, a mouse, a camera, a microphone, an accelerometer, a gyroscope, etc.; an output device 907 including, for example, a Liquid Crystal Display (LCD), a speaker, a vibrator, etc.; a storage device 908 including, for example, a magnetic tape, a hard disk, etc.; and a communication device 909. The communication device 909 may allow the electronic device 900 to communicate in a wireless or wired manner with other devices to exchange data. While FIG. 9 illustrates the electronic device 900 having various devices, it is to be understood that not all illustrated device are required to be implemented or provided. More or fewer devices may alternatively be implemented or provided.

In particular, the processes described above with reference to flow charts may be implemented as computer software programs in accordance with embodiments of the present disclosure. For example, embodiments of the present disclosure include a computer program product including a computer program carried on a non-transitory computer-readable medium, the computer program including program code for performing the method illustrated by the flow charts. In such embodiments, the computer program may be downloaded and installed from a network via the communication device 909, or installed from the storage device 908, or installed from the ROM 902. When the computer program is executed by the processing device 901, the above-described functions defined in the method of the embodiment of the present disclosure are performed.

It is appreciated that the computer-readable medium described above in the present disclosure may be either a computer-readable signal medium or a computer-readable storage medium, or any combination thereof. The computer-readable storage medium may be, for example but not limited to, an electronic, magnetic, optical, electromagnetic, infrared, or semiconductor system, apparatus, or device, or a combination thereof. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program that may be used by or in conjunction with an instruction execution system, apparatus, or device. In the present disclosure, the computer-readable signal medium may include a data signal embodied in baseband or propagated as part of a carrier carrying computer-readable program code. Such propagated data signals may take many forms, including but not limited to, an electromagnetic signal, an optical signal, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: an electrical wire, an optic cable, a RF (radio frequency), and the like, or any suitable combinations thereof.

In some embodiments, the client and server may communicate using any currently known or future-developed network protocol, such as HTTP (HyperText Transfer Protocol), and may be interconnected with any form or medium of digital data communication (e.g., a communication network). Examples of the communication network include a local area network ("LAN"), a wide area network ("WAN"), an international network (e.g., the Internet), and a peer-to-peer network (e.g., ad hoc peer-to-peer networks), as well as any currently known or future-developed networks.

The computer readable medium may be contained in the above-described electronic device; and it may also be present separately and not installed into the electronic device.

The computer-readable medium carries one or more programs that, when executed by the electronic device, cause the electronic device to perform the following acts:

receiving a read request sent by a user, wherein the read request includes an identifier of the file to which target data to be read belongs, and an identifier of the position of the target data in the file, and wherein the file is distributedly written into a magnetic disk array in the sliced data form; querying a pre-read chain list in a memory according to the read request, wherein the pre-read chain list includes at least one file node, each file node includes at least one chain of ordered data blocks, and each data block stores pre-read data corresponding to the file node; in a case that a file node matching the identifier of the file is not found in the pre-read chain list in the querying, determining whether the read request satisfies a sequential read behavior according to the identifier of the position, and whether a currently-recorded number of times of the sequential read behavior satisfies a sequential read threshold; in a case that the sequential read behavior and the sequential read threshold are satisfied, reading sliced data from the magnetic disk array according to a pre-read policy and the read request to generate ordered pre-read data, wherein the pre-read data includes the target data, and the pre-read data is stored into a file node of the pre-read chain list in an ordered manner in the data block form, and a read response containing the target data is sent to the user. In the present technical solution, based on the determination of the number of times of sequential read behaviors, the data to be read next time is accurately predicted and pre-read, which improves the hit rate of the pre-read data; furthermore, the pre-read data is maintained in the pre-read chain list in the data block form for the distributed file, and the data pre-reading is performed based on the storage characteristics of the distributed system, which realizes the pre-reading of the file under the distributed system and improves the throughput rate of the pre-reading the data.

The computer program code for carrying out operations of the present disclosure may be written in one or more programming languages or combinations thereof. The programming languages include, but not limited to, an object-oriented programming language, such as Java, smalltalk, C++, and a conventional procedural programming language, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The units described in connection with the embodiments disclosed herein may be implemented in a software or hardware manner. The names of the units do not constitute limitations of the units themselves in a certain case.

The functions described herein above may be performed, at least in part, by one or more hardware logic components. For example, without limitation, exemplary types of hardware logic components that may be used include: a Field Programmable Gate Array (FPGA), an Application Specific Integrated Circuits (ASIC), an Application Specific Standard Products (ASSP), a Systems On Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combinations thereof. More specific examples of the machine-readable storage medium would include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof.

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also include other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

I claim:

1. A method for processing a distributed file, comprising:
   receiving a read request sent by a user, wherein the read request comprises an identifier of a file to which target data to be read belongs, and an identifier of a position of the target data in the file, and wherein the file is distributedly written into a magnetic disk array in a sliced data form, the file is divided into a plurality of sliced data, and the magnetic disk array comprises a plurality of object-based storage devices each of which stores at least one of the plurality of sliced data;
   querying a pre-read chain list in a memory according to the read request, wherein the pre-read chain list comprises at least one file node, each file node comprises at least one chain of ordered data blocks, and each data block stores pre-read data corresponding to the file node;
   in a case that a file node matching the identifier of the file is not found in the pre-read chain list in the querying, determining whether the read request satisfies a sequential read behavior according to the identifier of the position, and whether a currently-recorded number of times of the sequential read behavior satisfies a sequential read threshold, wherein the sequential read behavior indicates that the target data is continuous with historical data corresponding to a previous request; and
   in a case that the sequential read behavior and the sequential read threshold are satisfied, reading sliced data from the magnetic disk array according to a pre-read policy and the read request to generate ordered pre-read data comprising the target data, to store the pre-read data into a file node of the pre-read chain list in an ordered manner and in a data block form, and to send a read response containing the target data to the user.

2. The method according to claim 1, wherein each file node comprising at least one chain of ordered data blocks comprises:
   each said file node comprising at least one segment node, each segment node corresponding to one chain of sequential data blocks, the segment node being configured to indicate a position of pre-read data stored in the data blocks in the file by a number in the chain of data blocks, wherein chains of data blocks, among different segment nodes, are not sequentially connected.

3. The method according to claim 2, wherein before determining whether the read request satisfies the sequential read behavior according to the identifier of the position, and whether the currently-recorded number of times of the sequential read behavior satisfies the sequential read threshold, the method further comprises:
   in a case that a target file node matching the identifier of the file is found in the pre-read chain list in the querying, but a segment node matching the identifier of the position is not found in the querying, determining whether the read request satisfies the sequential read behavior according to the identifier of the position, and whether the currently-recorded number of times of the sequential read behavior satisfies the sequential read threshold.

4. The method according to claim 1, wherein determining whether the read request satisfies the sequential read behavior according to the identifier of the position comprises:
   determining a starting position for reading the file according to the identifier of the file and the identifier of the position;
   obtaining a previous ending position pre-recorded for a pre-read mode; and
   determining whether the read request is the sequential read behavior according to the starting position and the previous ending position.

5. The method according to claim 4, wherein after determining whether the read request is the sequential read behavior according to the starting position and the previous ending position, the method further comprises:
   in a case that it is determined to be a non-sequential behavior, sending a failed read response to the user to instruct to directly read the target data from the magnetic disk array by the user, and increasing a number of times of non-sequential read by one;
   in a case that it is determined that a current number of times of the non-sequential read reaches a random read threshold, determining that a switching condition of the pre-read mode is satisfied, and setting relevant parameters recorded in the pre-read mode to be zero; and
   in a case that it is determined that the current number of times of the non-sequential read does not reach the random read threshold, determining that the switching condition of the pre-read mode is not satisfied.

6. The method according to claim 1, wherein reading sliced data from the magnetic disk array according to the pre-read policy and the read request to generate ordered pre-read data comprises:
   querying a preset first data block pre-read mapping relationship, to obtain a number of first pre-read data blocks corresponding to the number of times of the sequential read behavior;
   determining a sliced data starting position on the magnetic disk array according to the identifier of the file and the identifier of the position; and
   reading corresponding sliced data from the sliced data starting position of the magnetic disk array to generate ordered pre-read data, according to the number of the first pre-read data blocks and a preset data block size.

7. The method according to claim 1, wherein after determining whether the read request satisfies the sequential read behavior according to the identifier of the position, and whether the currently-recorded number of times of the sequential read behavior satisfies the sequential read threshold, the method further comprises:
   in a case that the sequential read behavior is satisfied but the sequential read threshold is not satisfied, or in a case that the sequential read behavior is not satisfied, sending a failed read response to the user to instruct to read the target data directly from the magnetic disk array by the user.

8. The method according to claim 1, wherein before determining whether the read request satisfies the sequential read behavior according to the identifier of the position, and whether the currently-recorded number of times of the sequential read behavior satisfies the sequential read threshold, the method further comprises:

querying a pre-read flag in the pre-read chain list, to determine whether the memory is currently pre-reading data from the magnetic disk array;
   in a case that it is determined by the querying that the pre-read flag indicates the memory being currently pre-reading, determining whether data information currently pre-read contains the target data; and
   in a case that it is determined that the data information currently pre-read contains the target data, waiting until a completion of the pre-reading, to send the read response containing the target data to the user.

9. The method according to claim 8, wherein determining whether the read request satisfies the sequential read behavior according to the identifier of the position, and whether the currently-recorded number of times of the sequential read behavior satisfies the sequential read threshold comprises:
   in a case that it is determined that the data information currently pre-read does not contain the target data, performing the determining whether the read request satisfies the sequential read behavior according to the identifier of the position, and whether the currently-recorded number of times of the sequential read behavior satisfies the sequential read threshold.

10. The method according to claim 2, further comprising:
    querying a target file node matching the identifier of the file in the pre-read chain list, and a target segment node containing the target data in the target file node according to the identifier of the position;
    determining a read starting position of a data block and a read ending position of the data block, in the target segment node, according to the identifier of the position; and
    obtaining the target data from a corresponding data block section according to the read starting position and the read ending position, to send the reading response containing the target data to the user.

11. The method according to claim 10, wherein obtaining the target data from the corresponding data block section according to the read starting position and the read ending position comprises:
    querying whether a pre-marked current version number corresponding to the data block section is valid;
    in a case that it is determined from the querying that the current version number is valid, obtaining the target data from the corresponding data block section according to the read starting position and the read ending position; and
    in a case that it is determined from the querying that the current version number is invalid, sending a failed read response to the user to instruct to directly read the target data from the magnetic disk array by the user.

12. The method according to claim 10, further comprising:
    obtaining a last data block ending position in the target segment node;
    obtaining a pre-read data margin between the read ending position and the last data block ending position; and
    determining whether the pre-read data margin is less than a pre-read threshold, and in a case that it is determined that the pre-read data margin is less than the pre-read threshold, reading corresponding sliced data from the magnetic disk array to obtain pre-read data, to store the pre-read data in the pre-read chain list in the data block form.

13. The method according to claim 12, wherein the reading corresponding sliced data from the magnetic disk array to obtain pre-read data comprises:
   querying a preset second data block pre-read mapping relationship, to obtain a number of second pre-read data blocks corresponding to the pre-read data margin; and
   reading corresponding sliced data from the magnetic disk array according to the last data block ending position, the number of the second pre-read data blocks and a preset data block size, to obtain ordered pre-read data.

14. The method according to claim 10, further comprising:
   in a case of detecting that a reading for target data block in the target segment node is completed, detecting whether there are other data blocks previous to the target data block;
   in a case that there are the other data blocks, deleting a part of the data blocks previous to the target data block according to a preset interval number.

15. The method according to claim 1, further comprising:
   querying a latest read request time recorded in each file node in the pre-read chain list according to a preset period; and
   detecting whether a time difference between the latest read request time and a current time is greater than a preset time threshold, to delete, from the pre-read chain list, the file node with the time difference greater than the time threshold.

16. An electronic device, comprising:
   a processor; and
   a memory configured to store an instruction executable by the processor,
   wherein the processor is configured to read the executable instruction from the memory, and execute the instruction to:
   receive a read request sent by a user, wherein the read request comprises an identifier of a file to which target data to be read belongs, and an identifier of a position of the target data in the file, and wherein the file is distributedly written into a magnetic disk array in a sliced data form, the file is divided into a plurality of sliced data, and the magnetic disk array comprises a plurality of object-based storage devices each of which stores at least one of the plurality of sliced data;
   query a pre-read chain list in a memory according to the read request, wherein the pre-read chain list comprises at least one file node, each file node comprises at least one chain of ordered data blocks, and each data block stores pre-read data corresponding to the file node;
   in a case that a file node matching the identifier of the file is not found in the pre-read chain list in the querying, determine whether the read request satisfies a sequential read behavior according to the identifier of the position, and whether a currently-recorded number of times of the sequential read behavior satisfies a sequential read threshold, wherein the sequential read behavior indicates that the target data is continuous with historical data corresponding to a previous request; and
   in a case that the sequential read behavior and the sequential read threshold are satisfied, read sliced data from the magnetic disk array according to a pre-read policy and the read request to generate ordered pre-read data comprising the target data, to store the pre-read data into a file node of the pre-read chain list in an ordered manner and in a data block form, and to send a read response containing the target data to the user.

17. The electronic device according to claim 16, wherein each file node comprising at least one chain of ordered data blocks comprises:
   each said file node comprising at least one segment node, each segment node corresponding to one chain of sequential data blocks, the segment node being configured to indicate a position of pre-read data stored in the data blocks in the file by a number in the chain of data blocks, wherein chains of data blocks, among different segment nodes, are not sequentially connected.

18. The electronic device according to claim 17, wherein the processor is further configured to read the executable instruction from the memory, and execute the instruction to:
   in a case that a target file node matching the identifier of the file is found in the pre-read chain list in the querying, but a segment node matching the identifier of the position is not found in the querying, determine whether the read request satisfies the sequential read behavior according to the identifier of the position, and whether the currently-recorded number of times of the sequential read behavior satisfies the sequential read threshold.

19. The electronic device according to claim 16, wherein the processor is further configured to:
   determine a starting position for reading the file according to the identifier of the file and the identifier of the position;
   obtain a previous ending position pre-recorded for a pre-read mode; and
   determine whether the read request is the sequential read behavior according to the starting position and the previous ending position.

20. A non-transitory computer-readable storage medium stored with a computer program which, when executed in a computer, causes the computer to:
   receive a read request sent by a user, wherein the read request comprises an identifier of a file to which target data to be read belongs, and an identifier of a position of the target data in the file, and wherein the file is distributedly written into a magnetic disk array in a sliced data form, the file is divided into a plurality of sliced data, and the magnetic disk array comprises a plurality of object-based storage devices each of which stores at least one of the plurality of sliced data;
   query a pre-read chain list in a memory according to the read request, wherein the pre-read chain list comprises at least one file node, each file node comprises at least one chain of ordered data blocks, and each data block stores pre-read data corresponding to the file node;
   in a case that a file node matching the identifier of the file is not found in the pre-read chain list in the querying, determine whether the read request satisfies a sequential read behavior according to the identifier of the position, and whether a currently-recorded number of times of the sequential read behavior satisfies a sequential read threshold, wherein the sequential read behavior indicates that the target data is continuous with historical data corresponding to a previous request; and
   in a case that the sequential read behavior and the sequential read threshold are satisfied, read sliced data from the magnetic disk array according to a pre-read policy and the read request to generate ordered pre-read data comprising the target data, to store the pre-read data into a file node of the pre-read chain list in an ordered manner and in a data block form, and to send a read response containing the target data to the user.

\* \* \* \* \*